(12) United States Patent
Stark (10) Patent No.: US 9,361,628 B2
(45) Date of Patent: Jun. 7, 2016

(54) INTERACTIVE VIDEO SHELVING SYSTEM (76) Inventor: Dean Stark, Toronto (CA)

(*) Notice: Subject to any disclaimer, the term of this patent is extended or adjusted under 35 U.S.C. 154(b) by 713 days.

(21) Appl. No.: 13/641,187

(22) PCT Filed: Apr. 13, 2011

(86) PCT No.: PCT/CA2011/000412
§ 371 (c)(1),
(2), (4) Date: Dec. 20, 2012

(87) PCT Pub. No.: WO2011/127577
PCT Pub. Date: Oct. 20, 2011

(65) Prior Publication Data
US 2013/0090996 A1  Apr. 11, 2013

Related U.S. Application Data

(60) Provisional application No. 61/323,620, filed on Apr. 13, 2010.

(51) Int. Cl.
| A47F 3/14 | (2006.01) |
| G06Q 30/02 | (2012.01) |
| A47F 11/06 | (2006.01) |
| A47F 3/00 | (2006.01) |
| A47F 5/00 | (2006.01) |

(52) U.S. Cl.
CPC ............ *G06Q 30/0241* (2013.01); *A47F 11/06* (2013.01); *G06Q 30/02* (2013.01); *A47F 3/00* (2013.01); *A47F 5/00* (2013.01); *G06Q 30/0267* (2013.01); *G06Q 30/0281* (2013.01)

(58) Field of Classification Search
CPC .......... A47F 3/00; A47F 3/14; A47F 5/0018; G06Q 30/0241; G06Q 30/0251; G06Q 30/0267; G06Q 30/0281; G06T 15/00; G06T 2207/30121
USPC ...................... 186/39, 52; 40/448; 211/126.3; 250/583; 382/154, 312; 705/14.49
See application file for complete search history.

(56) References Cited

U.S. PATENT DOCUMENTS

| 6,183,089 B1 | 2/2001 | Tehrani .............................. 353/7 |
| 7,119,759 B2* | 10/2006 | Zehner et al. .................. 345/1.1 |
| 7,492,973 B2* | 2/2009 | Cato ............................. 382/312 |

(Continued)

FOREIGN PATENT DOCUMENTS

| CA | 2794542 | 8/2011 |
| CA | 2794489 | 9/2011 |

(Continued)

OTHER PUBLICATIONS

International Search Report mailed Aug. 24, 2011 in corresponding PCT International Application No. PCT/CA2011/000412, (2 Pages).

(Continued)

*Primary Examiner* — Mark Beauchaine (57) ABSTRACT

A shelving system and method are disclosed. The shelving system includes: a plurality of shelves; at least one display screen; at least one camera, for optically detecting the contents of each one of the shelves; and at least one computing device in communication with the display screen and the at least one camera for presenting sales and promotional information on the display screen in dependence on the contents of the compartments as sensed by the sensors.

13 Claims, 6 Drawing Sheets

(56) References Cited

U.S. PATENT DOCUMENTS

| | | |
|---|---|---|
| 2002/0029205 A1 | 3/2002 | Pedraza et al. ................ 706/21 |
| 2002/0171637 A1 | 11/2002 | Kadowaki et al. ........... 345/204 |
| 2005/0055298 A1 | 3/2005 | Czora ............................ 705/35 |
| 2006/0074831 A1 | 4/2006 | Hyder et al. .................. 706/45 |
| 2006/0149570 A1 | 7/2006 | McDaniel et al. ........... 705/26.1 |
| 2008/0010169 A1 | 1/2008 | Dollens ........................ 705/27.2 |
| 2008/0256008 A1 | 10/2008 | Kwok ............................ 706/20 |
| 2010/0063862 A1 | 3/2010 | Thompson et al. .......... 705/7.29 |
| 2011/0191681 A1 | 8/2011 | Stark ............................. 715/716 |
| 2011/0238535 A1 | 9/2011 | Stark ............................. 705/27.1 |
| 2012/0206449 A1 | 8/2012 | Stark ............................. 345/419 |

FOREIGN PATENT DOCUMENTS

| | | |
|---|---|---|
| CN | 102844738 | 12/2012 |
| EP | 1837830 | 9/2007 |
| EP | 2 074 911 | 7/2009 |
| EP | 2074911 | 7/2009 |
| EP | 2531912 | 12/2012 |
| EP | 2553647 | 2/2013 |
| JP | 2000/298544 | 10/2000 |
| JP | 2003-104554 | 4/2003 |
| JP | 2008-200256 | 9/2008 |
| KR | 10-0405988 | 11/2003 |
| WO | 02/057896 | 7/2002 |
| WO | 2006/047487 | 5/2006 |
| WO | 2006/115261 | 11/2006 |
| WO | 2009/032772 | 3/2009 |
| WO | 2011/120051 | 9/2011 |
| WO | 2011/127577 | 10/2011 |
| WO | 2011/127578 | 10/2011 |
| WO | 2011/097309 | 12/2011 |
| WO | 2012/106815 | 8/2012 |

OTHER PUBLICATIONS

International Search Report dated Aug. 15, 2011, PCT/CA2011/000413 (2 pages).
International Search Report dated Oct. 4, 2011, PCT/US2011/023492 (3 Pages).
International Search Report dated Oct. 31, 2011, PCT/US2011/030220 (9 Pages).
International Search Report dated May 24, 2012, PCT/CA2012/000152 ( 11 Pages).
International Search Report dated Aug. 24, 2011, PCT/CA2011/000412 (2 pages).
J. L Hunt, B. G. Nickel, and Christian Gigault's paper "Anamorphic images" published in the American Journal of Physics, Mar. 2000, vol. 68, Issue 3, at pp. 232-237.
F. Leeman et al., "Hidden Images, Games of Perception Anamorphic Art Illusion", Harry N. Abrams, Inc., Publishers, New York, pp. 85-176 (1975).

* cited by examiner

INTERACTIVE VIDEO SHELVING SYSTEM

CROSS-REFERENCE TO RELATED APPLICATIONS

The present application is a 35 U.S.C. §§371 national phase conversion of PCT/CA2011/000412, filed Apr. 13, 2011, which claims priority to U.S. Provisional Patent Application No. 61/323,620, filed Apr. 13, 2010, the contents of which are hereby incorporated in full herein by reference. The PCT International Application was published in the English language.

FIELD OF THE INVENTION

The present invention relates generally to retail display arrangements, and more particularly to an interactive merchandise shelving system, providing video.

BACKGROUND OF THE INVENTION

In recent years, selling products in stores and specialty dealerships has become more difficult. Increased competition from other sales venues, such as the internet and mail order, increased product variety, and increased competition between retailers have all contributed to the difficulty.

Not surprisingly, retail and dealership venues have made efforts to enhance the shopping experience. Many retail outlets spend lavishly on décor, and offer on premises service and consultation.

Sales displays have also become more sophisticated. For example, some in-store displays and kiosks now rely on video and audio to provide advertising and product information, and to attract consumer attention.

Most such displays, however, are still quite static and do not engage the consumer.

Accordingly, there remains a need for more engaging, and interactive product display arrangements.

SUMMARY OF THE INVENTION

In accordance with an aspect of the present invention, there is provided a shelving system comprising: a plurality of compartments; a plurality of display screens, with one display screen mounted in each of the compartments behind an article display surface; at least one content sensor for sensing the content of each one of the compartments; and at least one computing device in communication with the display screens and the at least one sensor for presenting sales and promotional information on the display screens in dependence on the contents of the compartments as sensed by the sensors.

In accordance with another aspect of the present invention, there is provided a shelving system comprising: a plurality of shelves; at least one display screen; at least one camera, for optically detecting the contents of each one of the shelves; and at least one computing device in communication with the display screen and the at least one camera for presenting sales and promotional information on the display screen in dependence on the contents of the compartments as sensed by the sensors.

In accordance with yet another aspect of the present invention, there is provided a method of operating an interactive shelving systems. The method comprises a plurality of compartments for receiving items, with at least one display screen in each of the compartments. The method comprises: sensing the contents of identifiable items in each of the compartments, and presenting sales and promotional information on the display screens in dependence on the contents of the plurality of compartments as sensed.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
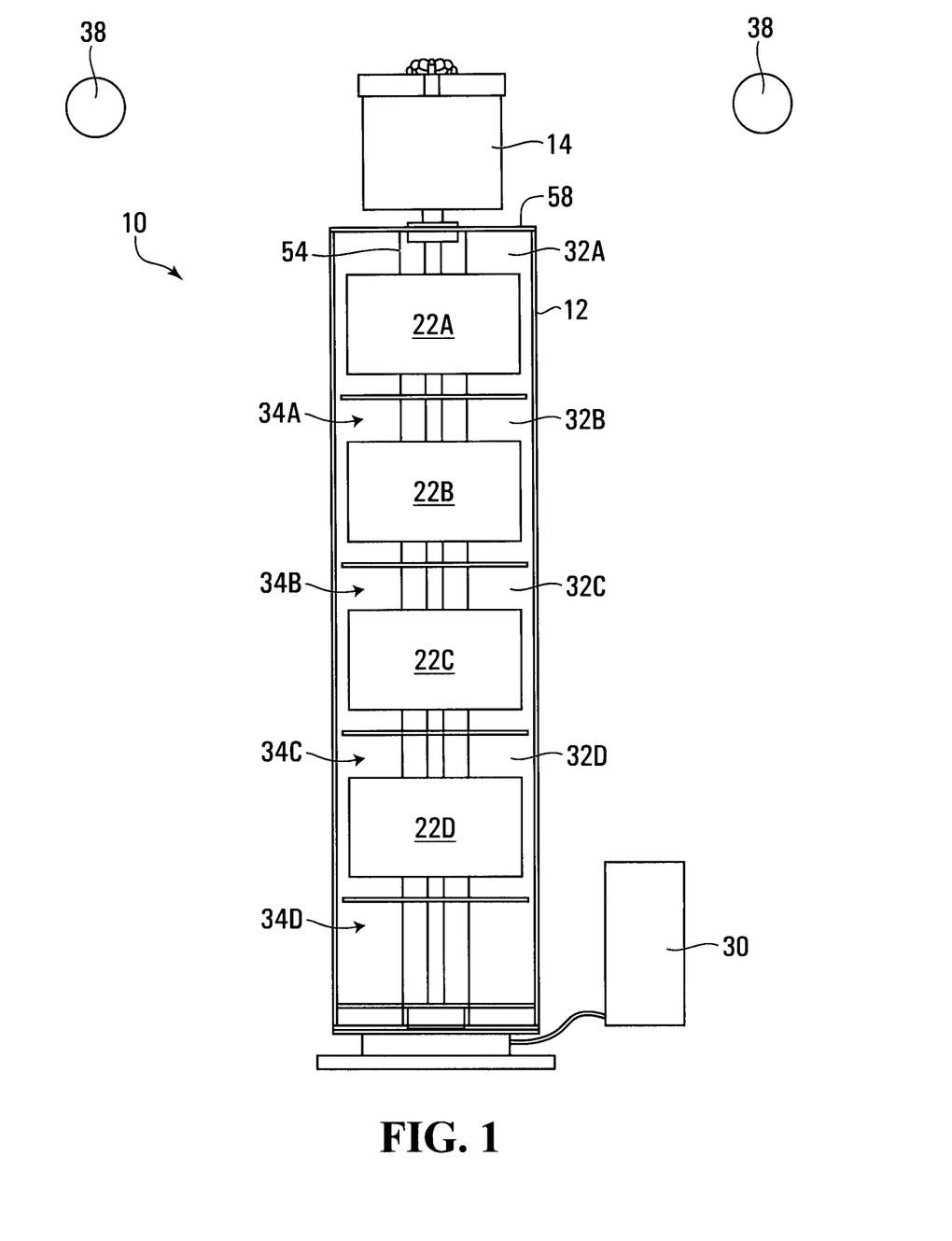
FIG. 1 is a front view of an interactive shelving system, exemplary of an embodiment of the present invention.

FIG. 1 is a front view of an interactive shelving system 10, exemplary of an embodiment of the present invention. Shelving system 10 includes a shelf unit 12 that defines multiple compartments 32a, 32b, 32c, 32d (individually and collectively compartment(s) 32. Each compartment 32 includes a support shelf 26a, 26b, 26c or 26d (individually and collectively shelf/shelves 26) for supporting items to be displayed thereon. In the depicted embodiment, shelf 26a supports items in compartment 32a; shelf 26b supports items in compartment 32b; shelf 26c supports items in compartment 32c, and so on.

Also formed within each compartment is a display screen 22a, 22b, 22c or 22d (individually and collectively display screen(s) 22). Each compartment 32 is further monitored by a content sensor 34. In the depicted embodiment, sensor 34a is associated with compartment 32a; sensor 34b is associated with compartment 32b; sensor 34c is associated with compartment 32c, and so on. Display screens 22 and content sensors 34 are interconnected with one or more computing devices 30 operable to monitor the content of each compartment and thereby the "state" of shelf unit 12, and present video images on screens 22 in dependence on the state of shelf unit 12 (or a portion thereof), as further detailed below.

As FIG. 1 is a front view of shelving system 10, only compartments 32 on the front of shelving system 10 are visible. Four further rear compartments 32e-32h are visible in FIG. 2 may be formed on a rear side of shelf system 10, symmetrical with compartments 32a-32d, about spine 54. Each of compartments 32e-32h may house a display screen 22 and be monitored by a content sensor 34.

Figure 2:
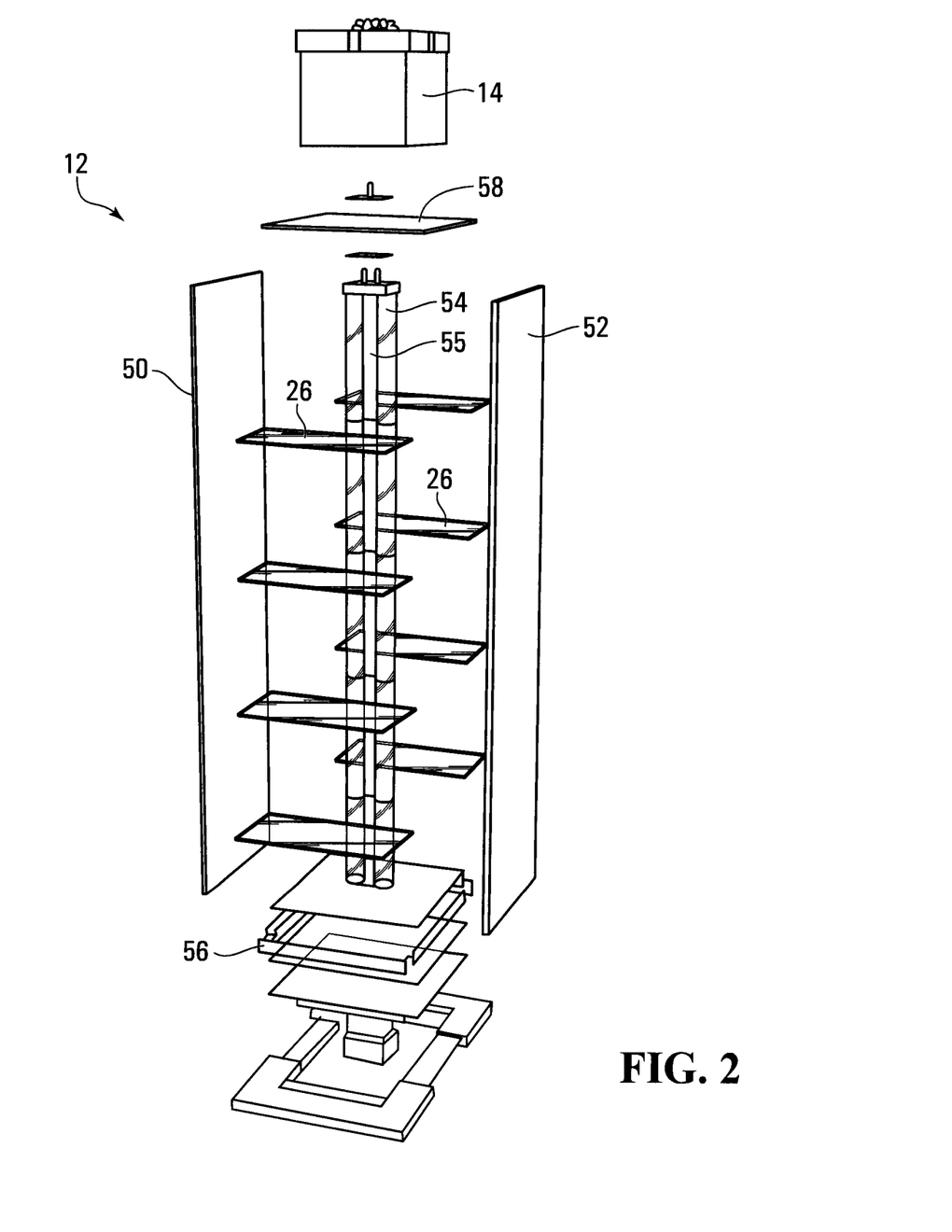
FIG. 2 is an exploded view of a shelf unit forming part of the shelf system of FIG. 1.

An exploded view of shelf unit 12 is depicted in FIG. 2. As illustrated, shelf unit 12 includes two opposing sidewalls 50, 52 separating a central spine 54 extending from a generally horizontal bottom base 56 to a generally flat horizontal top 58. As illustrated, central spine 54 extends upwardly from the general geometric center of base 56. A plurality of opposing shelves 26 are cantilevered on each side of spine 54. Spine 54 includes a central conduit 55 for transporting wires and cabling from base 56 or top 58 into each of compartments 32. Screens 22 (FIG. 1) may conveniently be mounted to spine 54. In this way, screens 22 are visible behind shelves 26.

As well, content sensors 34 may be mounted to one of side walls 52 or shelf 26 to monitor the content of a particular compartment 32.

In the depicted embodiment, content sensors 34 may take the form of cameras positioned within a line of sight of the bottom of shelf 26. In particular, the cameras may be low cost CCD cameras, including a universal serial bus interface for provision of video to computing device 30. Shelves 26 may be transparent. In this way, a camera may capture images of the contents of a compartment 32 within its line of sight, directly above a camera. In alternate embodiments, one or more cameras may be mounted within the view of a compartment. Cameras could be mounted above, within a corner or behind shelves 26, or elsewhere to provide an image of the content of a particular shelf.

Optionally, one or more audio transducers 38—for example in the form of surround sound loud speakers—may be mounted in proximity to shelf unit 12.

A further casing 14 may be mounted atop top 58. Casing 14 may have a transparent front, and may hold a marquis object, light, or other attractor for system 10. Optionally, computing device(s) 30 may be mounted atop of shelf unit 12 on top 58 in casing 14.

Figure 3:
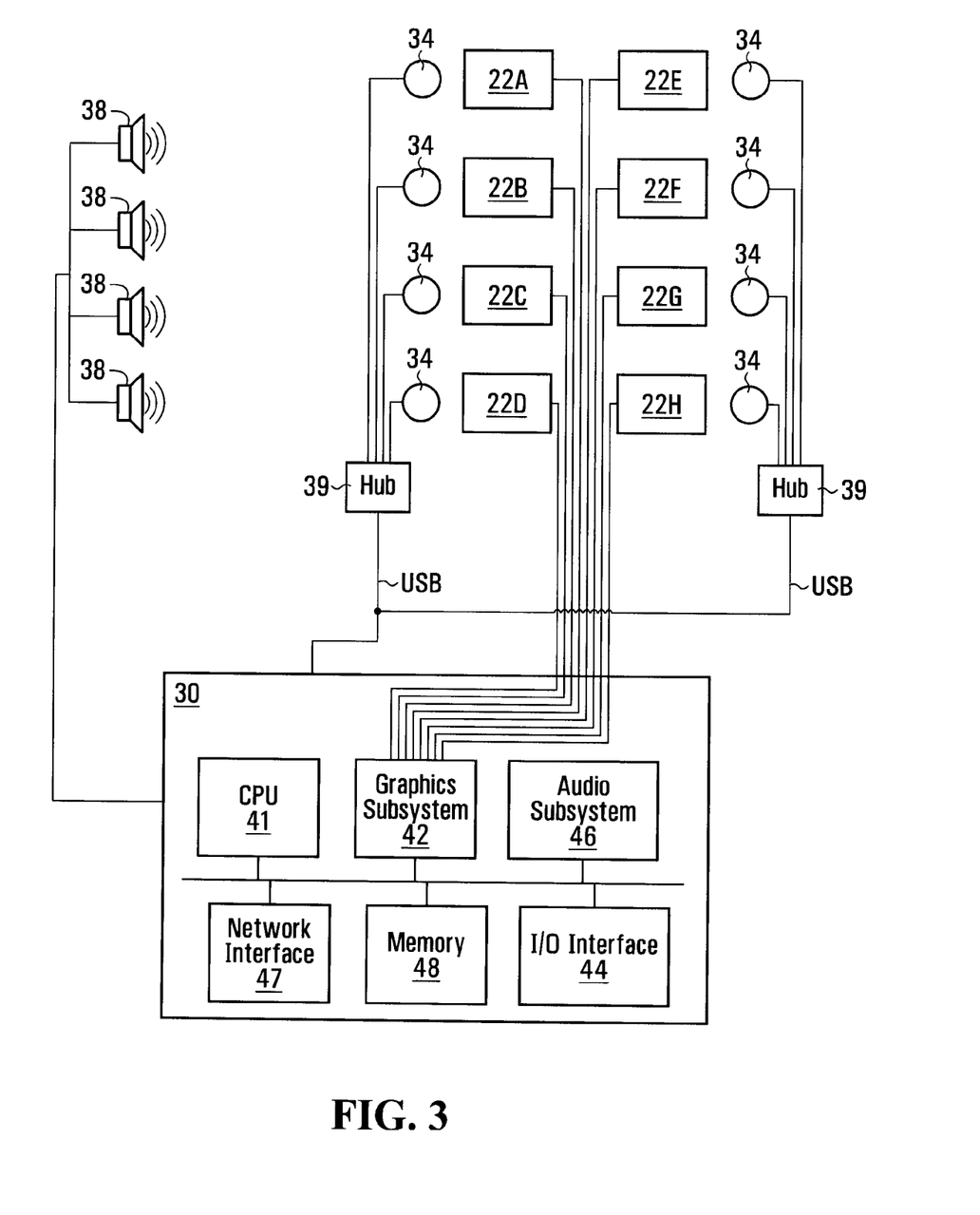
FIG. 3 is a simplified schematic block diagram of electrical components of the system of FIG. 1.

A schematic view of the electrical/electronic components of shelving system 10 is illustrated in FIG. 3. As illustrated, displays 22 (in the depicted embodiment displays 22*a* to 22*h*, corresponding to compartment 32*a*-32*h*) are in communication with one or more computing devices 30. Computing device 30 may be a single computer capable of driving a plurality of computer monitors or alternatively, multiple co-operating computing devices that may be co-located, to present graphic images on interconnected displays 22, and may include one more processors (or processing cores) 41. In any event, computing device 30 includes at least one graphics subsystem 42 for presenting graphics images on each of displays 22*a* through 22*h*. The graphics subsystem 42 may include a graphics processor, frame buffer, and one or more display interfaces for interconnecting displays 22. The display interface may be an HDMI, DisplayPort, DVI, or similar interface.

Further, computing device 30 includes one or more input/output ports/interfaces 44 for interconnection with sensors 34. As noted in the depicted embodiment, sensors 34 take the form of USB cameras. As such, the input/output port/interface 44 takes the form of one or more USB ports interconnected with corresponding USB hubs 39.

Audio transducers 38 may be interconnected with an audio subsystem 46 of computing device 30. The audio subsystem 46 may, for example, take the form of one or more audio cards 50 providing surround sound audio.

Further computing device 30 includes computer readable memory 48 in the form of random access and persistent storage memory. Persistent storage memory includes computing software exemplary of embodiments of the present invention causing shelving system 10 to operate in manners exemplary of embodiments of the present invention.

Computing device 30 may be also network aware. To that end computing device 30 may include a network interface 47, allowing computing device 30 to be interconnected to a data network, such as a local or wide area network, a cellular or optical network, or the like. Network interface 47 may for example, be an Ethernet interface, a GSM interface, a Wi-Fi interface, or the like.

As will become apparent, computing device 30 using conventional machine vision techniques may use sensors 34 to sense the contents of each compartment 32. Under software control, computing device 30 may then control what is being displayed on each of screens 22 in dependence of the contents of compartments 34. Likewise, audio presented to transducers 38 may be varied in dependence on the contents of compartments 32.

The machine vision techniques may determine the presence of a particular indicia on items to be placed on a shelf 26, or user interaction with such items. For example, the machine vision may detect a particular type of label or other indicia on an item. The label could be a colour pattern, a one or two dimensional bar code (or glyph), a unique marking or the like. Preferably, the indicia would not be readily perceptible by a consumer, or would not detract from the aesthetic characters of items on a shelf 26. In an embodiment, the machine vision software may detect the orientation of an item, a change in orientation of the item, or the interaction by a consumer with the item. For example, the machine vision techniques may detect when an item has been moved out of a compartment 32, or even within a compartment 32, or when its orientation has changed. A change in orientation and position, may for example be detected when the indicia of interest has changed position or orientation within the field of view of the camera acting as an associated sensor 34. Likewise it may determine the proximity of another item, or a consumer's hand or appendage. Software may thus be able to readily determine the contents of each shelf and the interaction of a customer with an item on the shelf.

Figure 4:
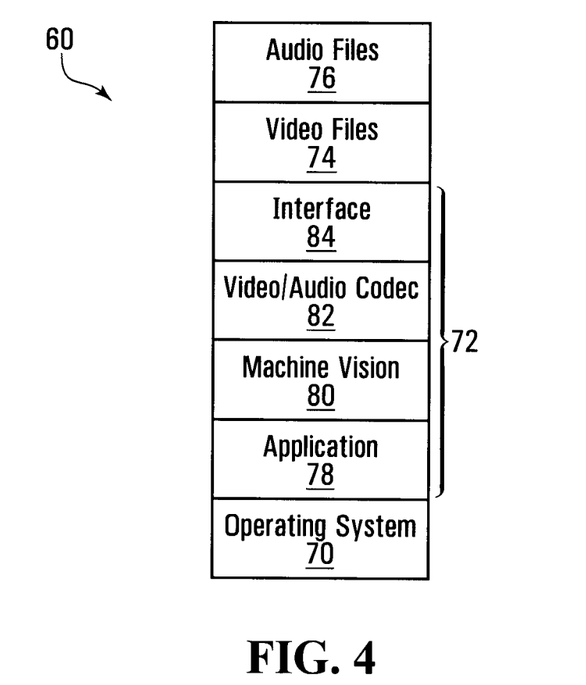
FIG. 4 is a block diagram of software and data components stored at a computing device of the shelving system of FIG. 1.

A simplified organization of software components 60 and relevant data 62 stored within persistent memory (i.e. memory 48) of computing device 30 is depicted in FIG. 4. As will be appreciated, the depicted software components may be loaded from a computer readable medium and stored within persistent memory 48 at computing device 30. The software components may be created using any of a numbering programming languages, techniques, and tools known to those of ordinary skill. As illustrated, software components may include an operating system software 70, application software 72 exemplary of embodiment of the present invention.

Relevant data 62 may include display/video files 74; audio files 76. Display/video files 74 may be video, picture, or other visual data or scripts for the presentation of graphics relevant to items to be showcased in display system 10. In an embodiment, the display/video files 74 may be computer rendered video files, rendered using 3D rendering software such as Autodesk's 3ds Max, Autodesk's 3D Studio Max, and/or Autodesk's MAYA or similar software packages. In alternate embodiments, display/video files 74 may be recorded/produced video files advertising a product of interest, or illustrating it in use.

Application software 72 may include a control component 78, controlling overall operation of shelf system 10, a machine vision component 80; audio/video codecs 82; and a interface component 84. Machine vision component 80 interacts with sensors 34 to detect the presence of items in compartments 32. Audio/video codecs 82 control graphics and audio subsystems 42 and 46 of computing device 30 to present video on screens 22, and provide audio to transducers 38. Interface component 84 may receive user input from an external interface such as a keyboard or kiosk (both not specifically illustrated) or the like. Alternatively, interface component 84 may receive user commands by way of a network such as a wireless or inter network. To this end, software components 60 (e.g. operating system 70) may include conventional networking components to allow computing device 30 to be connected to a local area network, or wide area network to receive network traffic from a local or wide area network, which may in turn be in communication with known wireless (e.g. cellular) networks and the Internet, through the described optional network interface. Interface component 84 may further influence the overall operation of shelving system 10, as detailed below.

Figure 5:
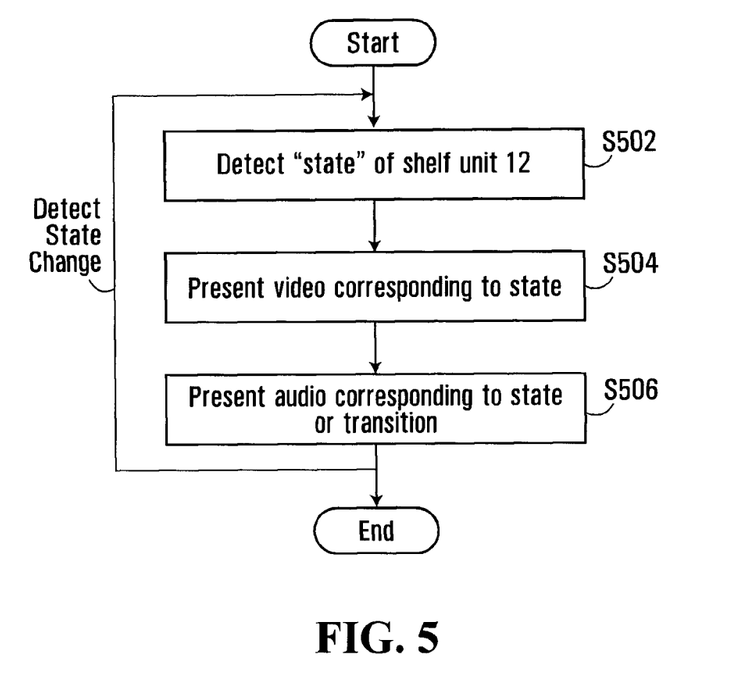
FIG. 5 is a flowchart illustrating operation of the shelf system of FIG. 1.

A simplified flow chart of shelving system 10, in operation, is illustrated in FIG. 5. Compartments 32 of shelving system 10 are loaded with items that may be detected by sensors 34. In one embodiment, the items may be merchandise for sale. The merchandise may be specially tagged or marked for easy recognition by sensors 34. Merchandise, may for example include visible one or two dimensional bar codes, tags, colour codes, or the like. Computing device 30 using machine vision software component 80 and sensors 34 may uniquely identify known contents of each compartment 32 by identifying associated indicia on the merchandise contained within each compartment using conventional machine vision techniques, as described above. In this way, software at computing device 30 may accurately at each point in time assess the content of each compartment, and the state of shelving unit 12 in block S502.

Knowing the content of each compartment 34 allows computing device 30 to control the presentation of video within each compartment. In block S504, computing device 30 selects a desired video from video files 74, for presentation on the multiple screens 22 in dependence on the content of the multiple compartments 32. For example, computing device 30 may present video in each compartment 32 that is representative of one or more items contained in the associated compartment 32. Alternatively, video associated with items in an adjacent compartment (e.g. the compartment above or below a particular compartment) may be presented in that compartment.

Likewise audio corresponding to the state may be presented through transducers 38 in block S506. Optionally, audio may be controlled by transitions from states of shelving unit 12, or other indicators provided by sensors 34 rather than by the state of shelving unit 12. So, for example, the selected audio may be chosen in dependence on the last item moved by a user, rather than by contents of compartments 32.

Likewise, other indicators provided by sensors 34 may further refine the video being presented on screens 22. For example, the orientation (or change thereof), user interaction (touch), or the like of items in a compartment 26, as sensed by an associate sensor 34 may further cause computing device 30 to select an appropriate video for presentation on one more of screens 22.

Blocks S502-S506 may be re-performed any time the state of shelf unit 12 changes (i.e. an item in one of compartments 32 is removed, or moved to another shelf). As well, other feedback from sensors 34 (e.g. the detection of user interaction; the movement of an item within a compartment; etc.) may be used as an indicator that blocks S502-S506 should be performed or other action should be taken. Likewise, interaction by a user with the user interface presented by or otherwise in communication with control/interface component 84 may influence presented video and audio.

For example, further user input may be solicited and video presented in each compartment 32 may be varied based on that further input. In this way, user may for instance, identify options for a particular item (e.g. colour, size, usage etc.) by way of a user interface and video in a particular compartment 32 may be presented reflective of that usage scenario. In this way for instance, a user may be presented with a particular sample of an item and then be allowed to see video of that item in different colours or environments in dependence on input. Such input may, for example, be provided by interacting with the item (e.g. placing a hand or other item or object into an associated compartment or by user input through an external peripheral such as the described keyboard or user input by way of a network such as by way of a cell phone or the like). Again, as the user interacts with the interface, the video for a particular compartment 32 may be changed, or different audio may be provided to transducers 38, by device 30.

The foregoing description presumes a finite number of primary states known to device 30. In each state, video presented for each display 22 may be determined. Each state may actually correspond to an arrangement of multiple items in each compartment 32. The contents of the compartment (and the state of shelf 12) may be approximated so that a known state is assessed. For example, if only states with one or no items in each compartment are known/contemplated, device 30 may approximate a state if two or more items are found in any compartment, by assuming the compartment with two items only has a single item. Alternatively, states may be maintained for any compartment that has unknown/unrecognized content.

In a simple case for instance, each compartment may be well suited to store a single item. Computing device 30 in turn senses the nature of the item in each compartment 32 and begins playback of associated video for that item in that compartment. In that way, computing device 30 may present as many independent video streams as there are compartments all based on the content of an associated compartment.

In a slightly more complicated scenario, a shelf 12 having four compartments, may be used to showcase four unique items—for example a Vase (V); an item of cutlery (C); a figurine (F); and a plate (P). Zero, one, two, three or four items may be placed in each compartment 32. Video corresponding to no item; any one of the four items; any two of the four items; any three of the four items; and all four of the items may be stored within memory 48. In this way, video information about multiple items together may be presented on each screen 22. The number of unique states will be 4×(1+4+6+4+1)=64. Depending on which items are in which compartment, computing device 30 may display corresponding video on the display for that compartment. As an item is moved from one compartment 32 to another, computing device 30 may sense a change of state of shelf unit 12 and may present video on the multiple displays corresponding to the change.

Conveniently, as may be appreciated, shelving system 10 may be put in a display environment in an empty state playing overall promotional material for a retail establishment. Further, as customers interact with merchandise within the retail establishment, the merchandise may be brought to shelving system 10. Shelving system 10 in turn may determine the content of each compartment and present promotional material specific to the item placed in the compartment. In this way, shelving system 10 may be used as an information kiosk for items otherwise located within the retail establishment.

In more complex scenarios, the position and interaction of each item may be taken into account when determining the state of system 10, as described above.

In the depicted embodiment, shelving system 10 includes compartments 32 arranged in an array. In the depicted embodiment, shelving system 10 includes an array of four shelves arranged vertically. As will be appreciated, the array could easily be two dimensional (i.e. m×n in size). Further, shelves need not be arranged in any particular geometric configuration, but could be arranged randomly or around a shelf of a particular shape (e.g. oval, egg-shaped, or the like).

As will be appreciated, shelving system 10 may be generalized beyond four or eight compartments. Moreover, a shelf unit 12 may house more than one logical shelving system. For example, compartments on each side of shelf unit 12 may co-operate to form a shelving system (like shelving system 10), exemplary of an embodiment of the present invention. In this way, a single shelf unit 12 may form two or more independent interactive shelf systems, without allowing interaction with one shelf system to affect the other. Likewise, a single shelving system 10 could span two or more physical shelf units, like shelf unit 12.

As well, in the depicted embodiment, shelving system 10 includes two opposing arrays of shelves, one behind the other. Again, a person skilled in the art will appreciate that shelving system 10 need only include shelves on one side. In this way, shelving system 10 could be placed against a wall or other surface that might obstruct access to one side of the shelving system 10.

Additionally, as may now be appreciated, additional peripherals could be added to shelf system 10 to further enhance interaction with a user. For example, shelf system 10 could include a printer to dispense written material in the form of coupons, brochures or the like in dependence on the state of shelf unit 12. Likewise, system 10 could include an output interface on computing device 30 to provide data dependent on the state of shelf unit 12 to a user by way of a smart phone, personal digital assistant or the like. Further system 10 could include a fragrance dispenser containing one or more fragrances. Interaction with system (e.g. causing a shelf unit 12 to assume a particular state; providing user input; etc.) could cause computing device to dispense one or more scents related to the contents of compartments 32.

Possibly, system 10 could also include an input peripheral for determining the identity of a consumer interaction with system 10. The input peripheral could be a scanner for loyalty cards, or a cellular network interface that determines the phone number or IMEI of a customer's cell phone. Of course collected input data, including a customer's identity, and interaction with system 10 (e.g. items of interest) could be logged in a database for later use and retrieval.

As well, cameras 34 could be replaced with other visual sensors, or other item sensors known to those of ordinary skill.

In an alternate embodiment, the base of shelf 12 could house a rotary motor that may function to rotate shelf unit 12 about an axis parallel to spine 54. The motor may rotate shelf 12 in synchronism with other shelves, at a very slow rate not immediately perceptible to a consumer. The motor may cause back and forth rotation of a shelf 12, by less than 360° (e.g. 340° or less) to allow cabling to extend to shelves 26. Alternatively a special coupling could be used to allow 360° rotation of shelf 12.

Figure 6A:
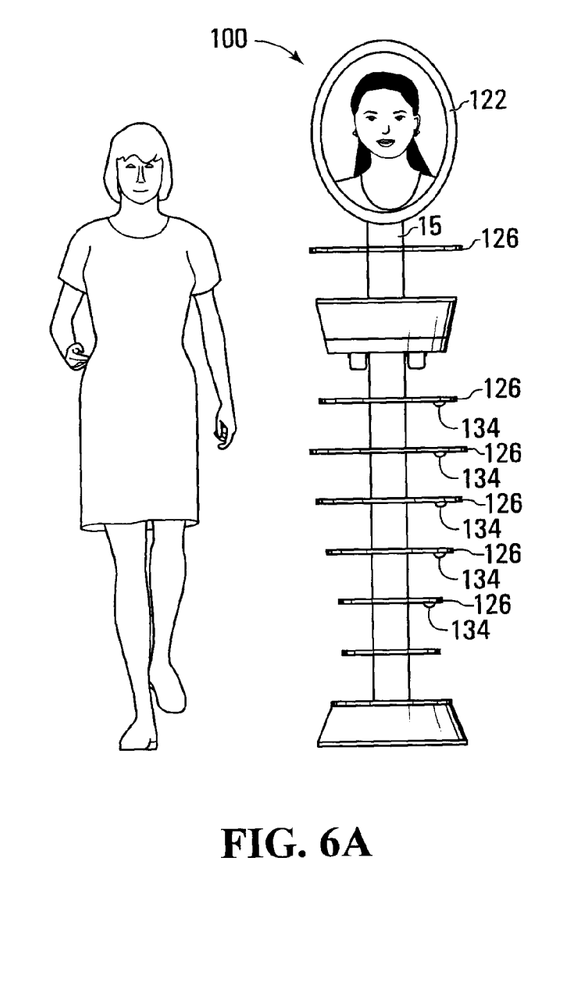
FIGS. 6A and 6B are front views of a further interactive shelf system exemplary of another embodiment of the present invention.
Figure 6B:
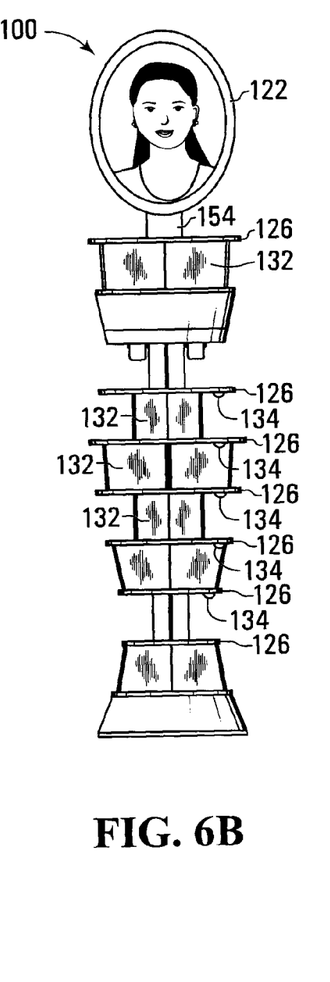

In yet alternate embodiments, system 10 may be adapted to include less screens than compartments. To that end, FIGS. 6A and 6B illustrate a further display system 100, exemplary of an embodiment of the present invention. Display system 100 includes a plurality of shelves 126, each accompanied by a sensor 134 (like sensor 34) operable to detect the contents of a shelf 126 using machine vision techniques as described above. A single screen 122, in the form of a projection screen, LCD, plasma, phosphour or similar screen may present visual information in dependence on the state of the shelves 126 of system 100. Shelves 126 and screen 122 may be mounted on an upwardly extending spine 154, at appropriate spacing and positions. In the depicted embodiment, screen 122 is at the average eye level of a target customer.

Shelves may be closed at their sides as in FIG. 6B, thus defining compartments 132, or open as in FIG. 6A.

A computing device (like computing device 30, but not shown) controls overall operation of system 100 as described above.

In a particular usage scenario, system 100 may be used for the sale and promotion of cosmetic goods. User interaction with items on shelves 126 as detected by machine vision, may prompt screen 122 to be animated with an avatar or video, representative of sales and promotional information. Additional sensor(s) may sense the proximity of a customer, viewing angle and the like. Such additional sensed conditions may be used in determining video and audio to be presenting, thereby enhancing the customer experience.

To that end, system 100, like system 10 may include peripheral that collect user information, and provide information and samples. In a particular embodiment, system 100 may include fragrance dispensers, cosmetic sample pumps and the like.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A shelving system comprising:
   a plurality of compartments;
   a plurality of display screens, with one display screen mounted in each of said compartments behind an article display surface;
   at least one content sensor for sensing the content of each one of said compartments; and
   at least one computing device in communication with said display screens and said at least one sensor for presenting video and sales and promotional information on said display screens in dependence on the contents of each of said compartments as sensed by said sensors,
   wherein said video comprises animation of products contained in the compartment in which it is presented, in use, formed by three-dimensional rendering software.

2. The shelving system of claim 1, wherein said compartments are arranged in an array.

3. The shelving system of claim 2 wherein said array is one dimensional.

4. The shelving system of claim 2, wherein said array is two dimensional.

5. The shelving system of claim 1, wherein each one of said compartments is generally rectangular and each of said display screens comprises a monitor.

6. The shelving system of claim 5, wherein each of said monitors is an LCD monitor.

7. The shelving system of claim 1, wherein each of said content sensors comprises a camera.

8. The shelving system of claim 7, wherein each of said compartments comprises a bottom support shelf formed of a transparent material.

9. The shelving system of claim 8, wherein each of said cameras is mounted below a bottom shelf of an overhead one of said compartments.

10. The shelving system of claim 1, wherein said shelving system comprises a plurality of opposing compartments.

11. A shelving system comprising:
    a plurality of shelves;
    at least one display screen;

at least one camera, for optically detecting the contents of each one of said shelves; and at least one computing device in communication with said display screen and said at least one camera for presenting video and sales and promotional information on said display screen in dependence on the contents of each of said compartments as sensed by said sensors, wherein said video comprises animation of products contained in the compartment in which it is presented, in use, formed by three-dimensional rendering software.

12. The shelving system of claim 11, wherein said computing device determines at least one of the nature of items; the orientation of items; the movement of items and the interaction of customers with items on said shelves, using said at least one camera.

13. A method of operating an interactive shelving systems comprising a plurality of compartments for receiving items, with at least one display screen in each of said compartments, said method comprising:

sensing the contents of identifiable items in each of said compartments, and presenting video and sales and promotional information on said display screens in dependence on the contents of each of said plurality of compartments as sensed, wherein said video comprises animation of products contained in the compartment in which it is presented, in use formed by three-dimensional rendering software.

* * * * *